United States Patent [19]

Moroto et al.

[11] 4,304,153
[45] Dec. 8, 1981

[54] AUTOMATIC TRANSMISSION WITH AN OVERDRIVE

[75] Inventors: Shuzo Moroto, Handa; Masakatsu Miura, Kariya; Kouji Sumiya, Hekinan; Michiaki Hiki, Kariya; Haruki Takemoto, Chiryu; Eiji Kato, Anjo, all of Japan

[73] Assignee: Aisin-Warner Kabushiki Kaisha, Aichi, Japan

[21] Appl. No.: 34,999

[22] Filed: May 1, 1979

[30] Foreign Application Priority Data

May 4, 1978 [JP] Japan .................................. 53-53455

[51] Int. Cl.³ ............................................. F16H 57/10
[52] U.S. Cl. ........................................ 74/759; 74/763; 74/765
[58] Field of Search .................. 74/764, 765, 758, 759, 74/695, 700, 701, 753, 763, , 740, 688; 192/3.3

[56] References Cited

U.S. PATENT DOCUMENTS

| | | | |
|---|---|---|---|
| 3,091,981 | 6/1963 | Peras | 74/759 |
| 3,270,585 | 9/1966 | Livezey | 74/688 X |
| 3,486,399 | 12/1969 | Forster | 74/765 X |
| 3,505,905 | 4/1970 | Lepelletier | 74/759 X |
| 3,614,902 | 10/1971 | Candellero | 74/763 X |
| 3,705,521 | 12/1972 | Smith | 74/759 |
| 3,802,294 | 4/1974 | Smirl | 74/765 X |
| 3,859,872 | 1/1975 | Clauss | 74/763 |
| 3,905,252 | 9/1975 | Zaiser | 74/759 |
| 4,049,093 | 9/1977 | Vukovich et al. | 192/3.3 |
| 4,095,487 | 6/1978 | Cartwright et al. | 74/763 X |
| 4,157,046 | 6/1979 | O'Malley | 74/753 X |
| 4,177,885 | 12/1979 | Ross | 192/3.3 |

*Primary Examiner*—George H. Krizmanich
*Attorney, Agent, or Firm*—Cooper, Dunham, Clark, Griffin & Moran

[57] ABSTRACT

An automatic transmission which is provided which has a transfer device between the speed change gears and an overdrive, said transfer device having an output gear which engages an input gear of a differential gear coaxially connected to an output shaft of the speed change gears.

5 Claims, 3 Drawing Figures

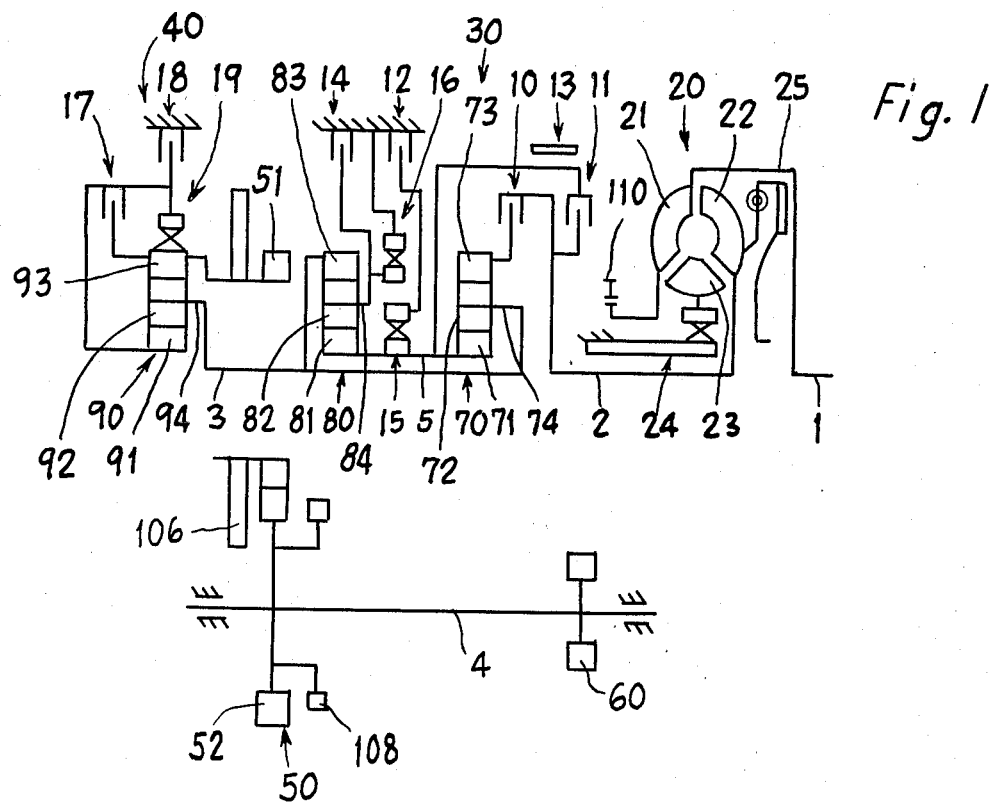
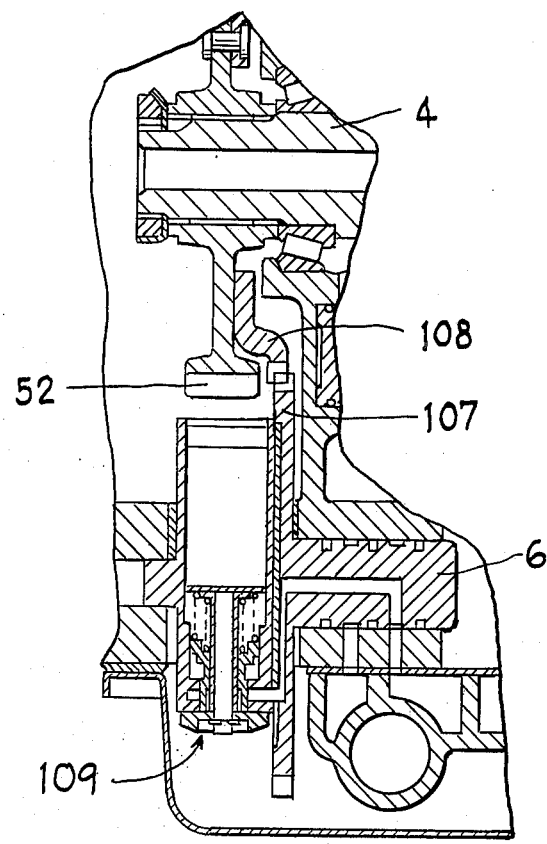
Fig. 1
Fig. 3

AUTOMATIC TRANSMISSION WITH AN OVERDRIVE

FIELD OF THE INVENTION

The present invention relates to an automatic transmission with an overdrive, and in particular, the present invention relates to an automatic transmission with an overdrive drive in an automobile with a front engine-front drive (F—F) system or a rear engine-rear drive (R—R) system.

DESCRIPTION OF THE PRIOR ART

Hitherto, in automatic transmission, the overdrive has been arranged between a transfer device and speed change gears as is disclosed in U.S. Pat. No. 4,095,487, etc. As a result, a relatively large design modification is needed in order to install an overdrive into an automatic transmission.

SUMMARY OF THE INVENTION

An object of the present invention is to provide a compact automatic transmission with an overdrive, preferably in an automobile with an F—F system or an R—R system. Another object of the present invention is to provide an overdrive unit for an automatic transmission not having an overdrive for an automobile with an F—F system or an R—R system with as little design modification as possible.

Briefly, these objects can be attained by installing an overdrive on the outside of a transfer device of an automatic transmission, said automatic transmission arranged and comprising in the following order: a transfer device, speed change gears, and a torque converter conventionally used for an automobile with an F—F system or an R—R system.

BRIEF DESCRIPTION OF THE DRAWINGS

In the accompanying drawings in which one of various possible embodiments is illustrated, FIG. 1 is a skeleton view showing the power transmission mechanism of the automatic transmission with an overdrive of the invention;

FIG. 3 is a sectional view showing the governor area of the automatic transmission with an overdrive of the invention.

DESCRIPTION OF THE PREFERRED EMBODIMENT

Figure 2:
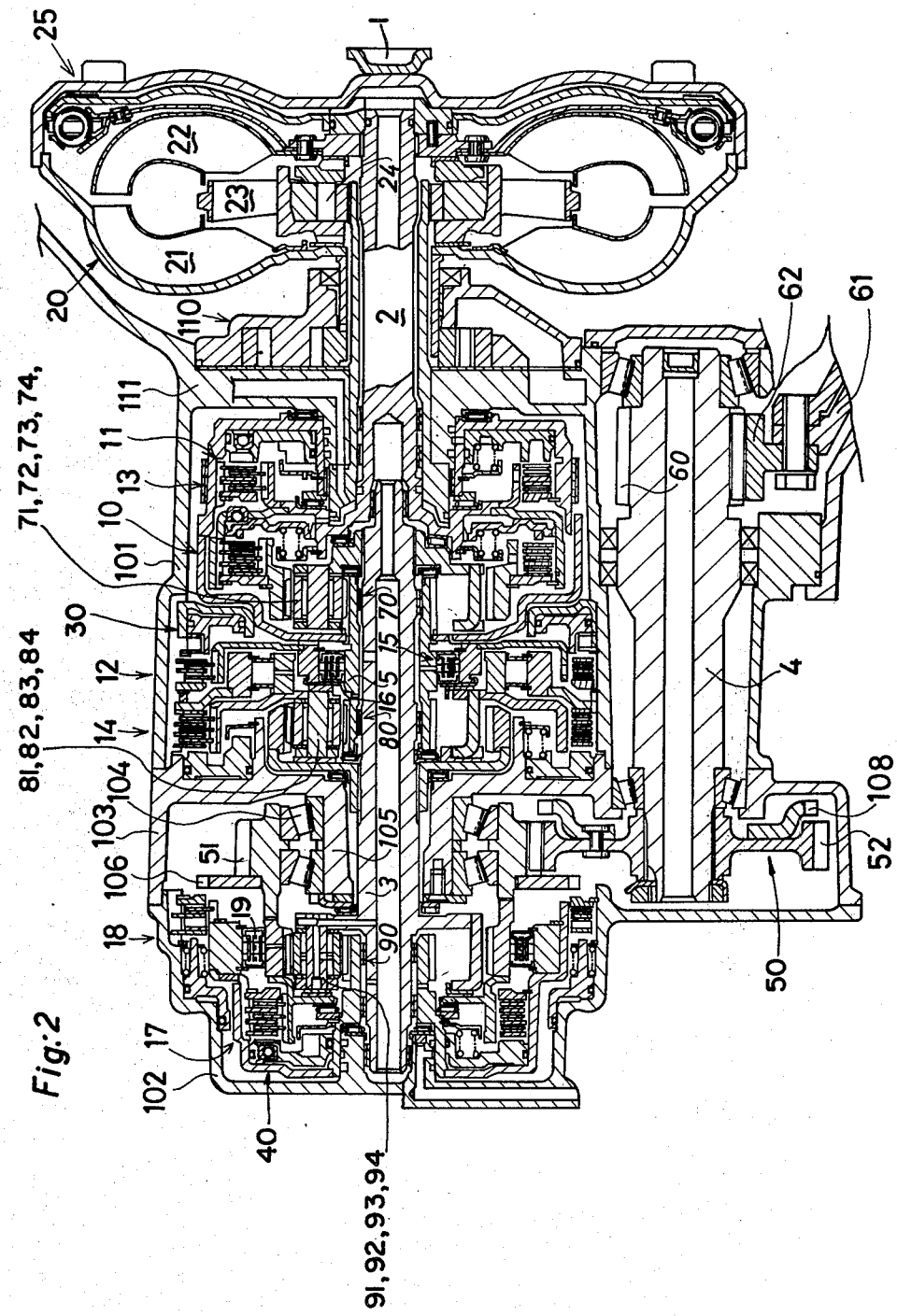
FIG. 2 is a sectional view showing the power transmission mechanism of the automatic transmission with an overdrive of the invention.

Referring to the drawings, one example of the invention is shown. In FIG. 1, a skeleton view is shown of the power transmission mechanism of the automatic speed change gears. In FIG. 2, a sectional view of the automatic transmission is shown.

In FIGS. 1 and 2, an automatic transmission of the invention is comprised of an input shaft 1 from an engine, a torque converter 20, an output shaft 2 of the torque converter 20, the speed change gears 30, an output shaft 3 of speed change gears 30, an overdrive 40, a transfer device 50, an output shaft 4, and an output gear 60. The torque converter 20 is comprised of a pump impeller 21, a turbine runner 22, a stator 23 supported by a one-way clutch 24, and a lock-up clutch 25. The pump impeller 21 is connected to the input shaft 1 from an engine at one end, and drives an oil pump 110 at the other end. The turbine runner 22 is connected to the output shaft 2 of the torque converter. When the lock-up clutch 25 is not operating, the power of the engine is transmitted to the turbine runner 22 through a fluid from the pump impeller 21, but in the operation of the lock-up clutch 25, the power from the engine is transmitted mechanically to the output shaft 2 of the torque converter without the intervention of a fluid. In addition, the torque converter 20 is a flat type so that it can be easily installed on a vehicle by shortening the size in an axial direction.

The speed change gears transmits the power from output shaft 2 of the torque converter to output shaft 3 through planetary gear sets 70, 80. Each of the planetary gear sets 70, 80 is comprised of a sun gear 71, 81, a planetary pinion 72, 82, a ring gear 73, 83 and a carrier 74, 84. The output shaft 2 of the torque converter is connected to the ring gear 73 of the planetary gear set 70 through a clutch 10, and at the same time, is connected through a clutch 11 to a sun gear shaft 5 having the sun gears 71, 81 of the planetary gear sets 70, 80 mounted thereon. The sun gear shaft 5 provides a brake 12 through a one-way clutch 15, and a brake 13 without the intervention of the one-way clutch 15. The carrier 84 of the planetary gear set 80 provides a brake 14 and a one-way clutch 16. The carrier 74 of the planetary gear set 70 and the ring gear 83 of the planetary gear set 80 are connected to the output shaft 3.

An overdrive 40 is comprised of a planetary gear set 90, a clutch 17, a brake 18 and a one-way clutch 19. The planetary gear 90 is comprised of a sun gear 91, a planetary pinion 92, a ring gear 93 and a carrier 94. The carrier 94 is connected to the output shaft 3 of the speed change gears 30. The sun gear 91 is connected to the ring gear 93 through the clutch 17 and the one-way clutch 19, and furthermore, the sun gear 91 is connected to the brake 18. In addition, the ring gear 93 is connected to a driving gear 51 which becomes the input of the transfer device 50.

The transfer device 50 is comprised of the driving gear 51 connected to the ring gear 93 of the planetary gear set 90, and of a driven gear 52 coaxially connected to an output shaft 4 arranged in parallel with the output shaft 3 of the planetary gear sets 30. The driving gear 51 is engaged with the driven gear 52.

An output gear 60 installed integrally with the output shaft 4 engages an input gear 62 of a differential gear 61.

The speed change gears 30 and the overdrive 40 have casings 101, 102 respectively. The casing 103 of the transfer device 50 is arranged between both casings 101, 102. The transfer device 50 is arranged between the speed change gears 30 and the overdrive device 40. In addition, the casing 101 is formed integrally with a pump cover 111 of an oil pump 110.

The driving gear 51 of the transfer device 50 is supported by bearing onto an internal circumferential flange area 105 of the casing 103 through a bearing 104.

In addition, a parking gear 106, which mechanically resists rotation upon parking of the vehicle, is installed onto the driving gear 51.

In addition, a governor shaft driving gear 108 engaged to a gear 107 installed on a governor shaft 6, as shown in FIG. 3, is installed on the driven gear 52 of the transfer device 50 to drive the governor shaft 6 arranged in parallel with the output shaft 4.

The manner of operation of clutches 10, 11, and 17, of brakes 12, 13, 14, and 18, and one-way clutches 15, 16, and 19 at each stage of speed change of the automatic transmission of the present invention is illustrated in Table 1.

TABLE 1

| Speed change stage | 10 | 11 | 12 | 13 | 14 | 15 | 16 | 17 | 18 | 19 |
|---|---|---|---|---|---|---|---|---|---|---|
| (2) First speed drive Starting low drive | O | | | | Δ | | * | O | | * |
| (3) Second speed drive | O | | O | Δ | | * | | O | | * |
| (4) Third speed drive | O | O | O | | | | | O | | * |
| (5) Fourth speed drive | O | O | O | | | | | | O | |
| (6) Backward drive or reverse drive | | O | | | O | | | | | |

In the Table 1, an open circle (O) indicates that the clutch or brake is actuated by a pressurized-oil operating mechanism. An open triangle (Δ) indicates that the brake is actuated by a pressurized-oil operating mechanism when engine braking is effected.

An asterisk (*) indicates that a one-way clutch is locked when the engine effects positive driving.

A description of the operation at each stage of speed change follows:

First forward speed drive:

Clutches 10, 17 and one-way clutches 16, 19 operate. The power from the input shaft, from an engine is transmitted to the output shaft 2 of the torque converter through the torque converter 20, and is transmitted to the ring gear 73 through a clutch 10. At this time, carrier 84 is urged to rotate in the reverse direction of shaft 2, but the rotation of the carrier 84 is restrained by the one-way clutch 16. The result is that the ring gear 83 is rotated in the same direction as the shaft 2 and rotates the output shaft 3 of the speed change gears 30. At the same time, the carrier 74 is also rotated in the same direction as the shaft 2, and rotates the shaft 3, with the result that the resultant torque is transmitted to the shaft 4. The rotation of the shaft 3 is transmitted to the carrier 94 of the overdrive 40. At this time, as the clutch 17 and the one-way clutch 19 operate, the planetary gear set 90 rotates integrally, and the same rotation is transmitted to the driving gear 51 of the transfer device 50 coaxially connected to the ring gear 93. The rotation is, furthermore, transmitted to the output shaft 4 through the driven gear 52, and drives the output gear 60. In addition, when engine braking is desired, as when travelling on a descent and the like, the rotation of carrier 84 in both direction is restrained by operating the brake 14.

Second forward speed drive:

In this case, clutches 10 and 17, a brake 12, and one-way clutches 15 and 19 operate. The power transmitted to the shaft 2 through the torque converter 20 is transmitted to the ring gear 73 through the clutch 10. At this time, the sun gear 71 is urged to rotate in the reverse direction of ring gear 73, but the rotation is restrained by the operation of the one-way clutch 15 and the brake 12. Thus, the planetary pinion 72 comes to revolve in the same direction as the shaft 2. As a result, the carrier 74 rotates in the same direction as the shaft 2 and the power is transmitted to the shaft 3. The power transmitted to the shaft 3 is transmitted to the output gear 60 in the same way as in the case of the first forward speed drive.

In addition, when engine braking is desired, as in the case of travelling on a descent and the like, the rotation of sun gear 71 in both direction is restrained by operating the brake 13.

Third forward speed drive:

Clutches 10, 11, and 17, the brake 12, and the one-way clutch 19 operate. The power transmitted to the shaft 2 through the torque converter 20 is transmitted to the ring gear 73 and the sun gear 71 through the clutches 10 and 11. Accordingly, at the planetary gear set 70, the planetary pinion 72 rotates integrally with the ring gear 73 and the sun gear 71. The power is transmitted to the carrier 74, and to the shaft 3. The power transmitted to the shaft 3 is transmitted to the output gear 60 in the same way as in the case of the first forward speed drive.

Fourth forward speed drive:

The clutches 10 and 11 and the brakes 12 and 18 operate. The power transmitted to the shaft 2 through the torque converter 20 is transmitted to the shaft 3 in the same way as in the case of the third forward speed drive, and is transmitted to the carrier 94 of the overdrive 40. At this time, as the sun gear 91 is held fixed by the brake 18, the ring gear 93 rotates at a speed greater than the rotation of the carrier 94. The power transmitted to the carrier 94 is transmitted to the driving gear 51 and is transmitted to the output gear 60 in the same way as in the case of the first forward speed drive.

Backward drive or reverse drive:

The clutches 11 and 17 and the brake 14 operate. The power transmitted to the shaft 2 through the torque converter is transmitted to the sun gear 81 through the clutch 11. At this time, as the carrier 84 is held fixed by the operation of the brake 14, the forward rotation of sun gear 81 drives the ring gear 83 in the reverse direction through planetary pinion gear 82. Thus, the power transmitted to sun gear 81 by shaft 2 is transmitted to shaft 3 through the reverse rotation of ring gear 83. Still the power transmitted to the shaft 3 is transmitted to the output gear 60 through the transfer device 50. In this way, the power transmitted to the output gear 60 is transmitted to the input gear 62 of the differential gear 61.

The manner of operation proceeds as described above whether the lock-up clutch 25 is released or is engaged.

As mentioned above, it is possible with this invention to provide a compact automatic transmission with an overdrive suitable for installation in an automobile with an F—F system or an R—R system. Modification of an automatic transmission with three forward speeds where the overdrive 40 has been removed, can be easily performed by mounting the casing 103 which supports the driving gear 51 onto a bearing between the casing 101 of the speed change gears 30 and the casing 102 of the overdrive.

We claim:

1. An automatic transmission with an overdrive, comprising:
   (a) a torque converter coaxially connected to an input shaft from an engine, said torque converter having an output shaft and transmitting power to said output shaft;
   (b) speed change gears drivingly connected to said torque converter output shaft whereby a reduction gear ratio equal to or more than one is obtained, said speed change gears comprising plural planetary gear sets, friction engaging elements and an output shaft, said speed change gears transmitting power to said speed change gears output shaft;

(c) an overdrive drivingly connected to said speed change gears output shaft whereby a reduction gear ratio of less than one is obtained, said overdrive comprising a planetary gear set and plural friction engaging elements, said planetary gear set comprising a planet carrier drivingly connected to said speed change gears output shaft, a planet pinion, a sun gear, and a ring gear as an output element;

(d) a transfer device arranged between said speed change gears and said overdrive, said transfer device comprising a driving gear drivingly connected to the output element of said overdrive, a driven gear engaged to said driving gear, and a transmission output shaft coaxially connected to said driving gear and in parallel with said speed change gears output shaft; and (e) an output gear coaxially connected to said transmission output shaft.

2. The automatic transmission with an overdrive of claim 1, having a casing (101) to support said speed change gears, a casing (102) to support said overdrive, and a casing (103) between casings (101) and (102) supporting said driving gear and said transmission output shaft, all of said casings independent of each other.

3. The automatic transmission with an overdrive of claim 2 wherein the casing (101) of said speed change gears is formed integrally with the pump cover of an oil pump installed adjacent to said torque converter.

4. The automatic transmission with an overdrive of claim 1, having a lock-up clutch connected to said torque converter.

5. The automatic transmission with an overdrive of claim 1 having a governor shaft, said governor shaft drivingly connected to said driving gear, said governor shaft arranged in parallel with said transmission output shaft.

* * * * *